April 12, 1966     Z. OLSEN     3,245,424
SERVO VALVE

Filed May 31, 1963     4 Sheets-Sheet 1

$i_s = i_1 - i_2$

Zenny Olsen
INVENTOR.

BY David A. Riel

ATTORNEY

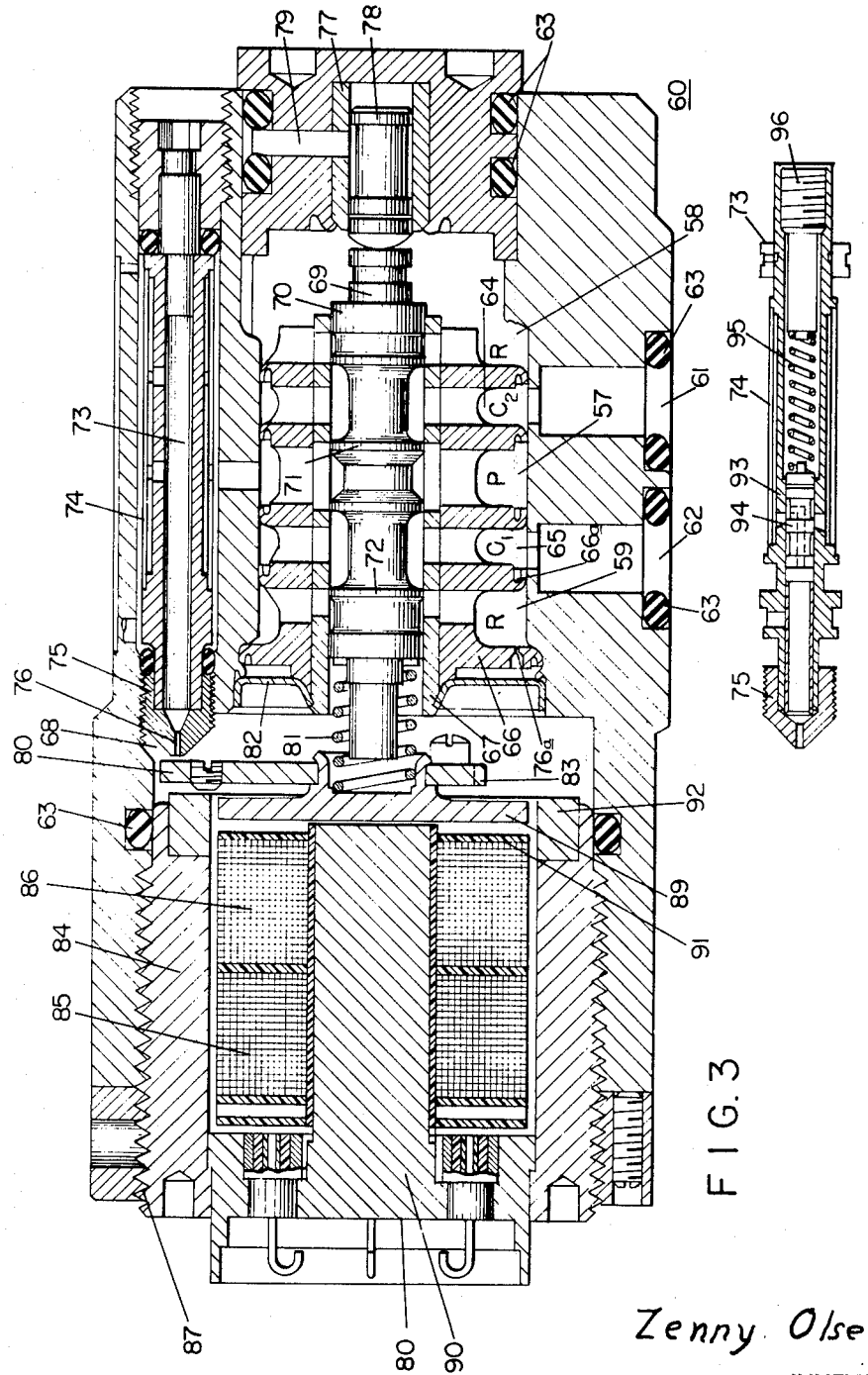

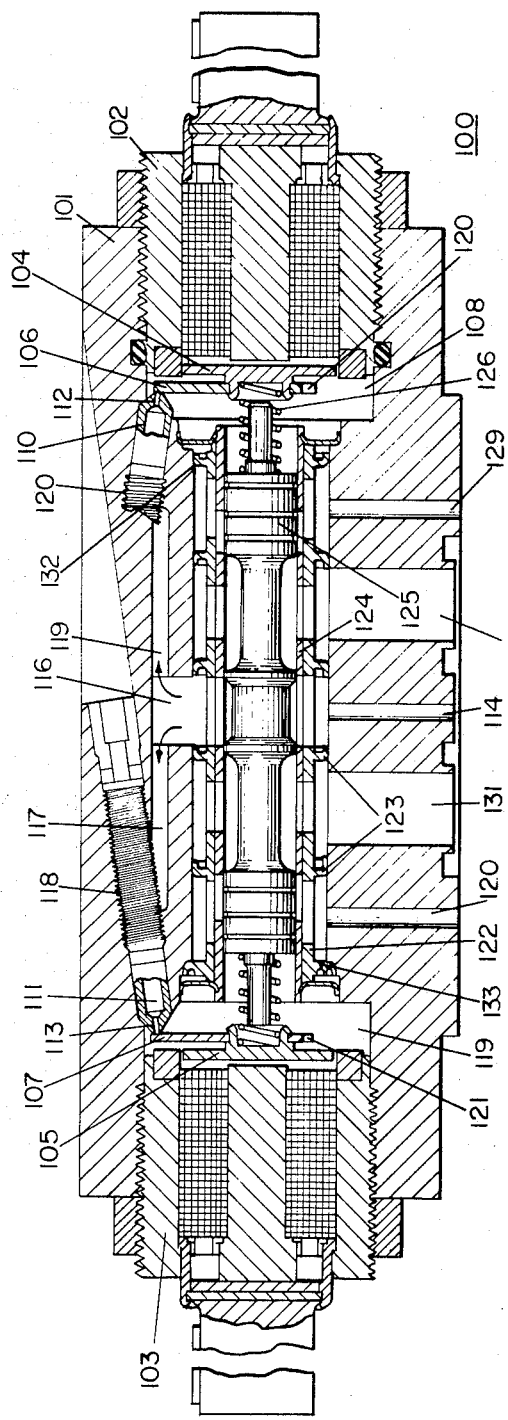
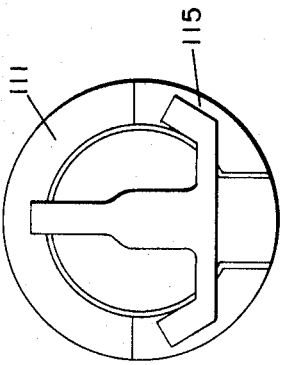
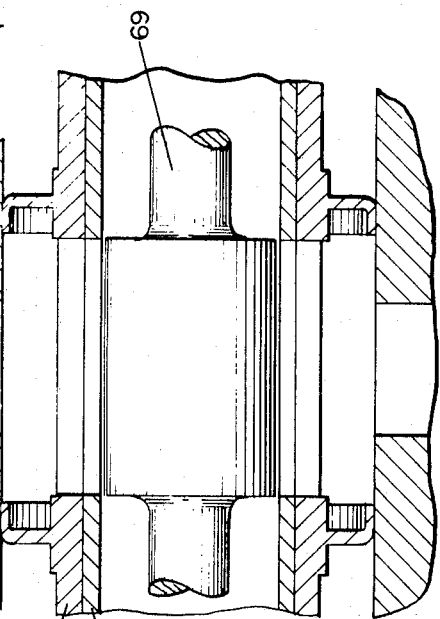
Zenny Olsen
INVENTOR.
BY David A. Rich
ATTORNEY

April 12, 1966         Z. OLSEN         3,245,424
                       SERVO VALVE
Filed May 31, 1963                      4 Sheets-Sheet 4

Zenny Olsen
INVENTOR.

BY David A. Rick
ATTORNEY

United States Patent Office 3,245,424
Patented Apr. 12, 1966

3,245,424
SERVO VALVE
Zenny Olsen, P.O. Box 381, Nashua, N.H.
Filed May 31, 1963, Ser. No. 284,405
7 Claims. (Cl. 137—85)

The present invention relates to electrohydraulic control apparatus. More particularly, the invention relates to two stage electrohydraulic servo valves having internal degenerative feedback.

The modern servo valve has become a necessary element of automatic control equipment. In general, the prior art electrohydraulic servo valve is currently characterized by a relatively high frequency response and stability of control obtained by virtue of internal degenerative feedback.

Such valves, however, are exceedingly intricate and require rather complicated and expensive manufacturing techniques. Maintenance in the field for prior art valves is difficult to achieve with any degree of reliability.

Prior art valves are subject to malfunction from contamination present in the control fluid. The problem of malfunction due to contamination in the pilot valve of a two stage electrohydraulic servo valve, having internal feedback, is treated in the prior art by introducing filtering in series with the pilot valve fluid.

Prior art valves are relatively large for a given output control characteristic. A valve, for example, for use in controlling an output maximum flow of ten gallons per minute at 1000 pounds per square inch weighs over 13 ounces. In contrast, the present valve having 5 gallons per minute at 1000 pounds per square inch weighs 8 ounces or less.

In order to achieve optimum response characteristics and sensitivity, an electromagnetic force motor is required which is capable of providing an output of as much as 500 grams. Such a prior art motor typically weighs 3 ounces; the motor of the invention achieves at least 33⅓ percent reduction in weight for the same force output. It is highly desirable to optimize the form factor in such a manner as to obtain maximum minaturization without sacrificing performance of the valve.

Two stage valves having a slidable piston in the control stage are subject to stiction. To overcome the stiction force, a small oscillating force is introduced to maintain the piston in continuous motion. This force is known as "dither" in the art and is introduced mechanically or electrically. It is highly desirable to overcome the problem of stiction without additional mechanisms.

It is therefore an object of the invention to provide an improved two stage electrohydraulic servo valve.

A further object of the invention is to provide an improved two stage electrohydraulic servo valve of the character described which is relatively light, compact, and economical to fabricate.

Yet another object of the invention is to provide an improved two stage electrohydraulic servo valve of the character described which is readily and economically maintained.

A still further object of the invention is to provide an improved two stage electrohydraulic servo valve of the character described having a minimum number of elastomer seals.

Another object of the invention is to provide an improved two stage electrohydraulic servo valve of the character described free of mechanical stiction.

In accordance with the invention there is provided a servo valve. The valve includes a pilot valve chamber having an input orifice for the flow of fluid under pressure and an output fixed orifice for providing a constant pressure drop. Motor means are provided having a cantilevered member for varying the flow of the fluid through the input orifice to vary the pressure in the pilot chamber in response to an input signal. A control valve cylinder is coupled to a source of fluid under pressure and has output control ports. A control piston is slidably mounted in the control cylinder for controlling fluid flow in the output control ports in accordance with the relative position of the control piston and the control cylinder.

The control piston is coupled to the pilot chamber for movement in accordance with the pressure in the chamber. Feedback means are coupled to the control piston and the cantilever member, whereby motion of the cantilever member so varies the pressure in the pilot chamber as to displace the control piston in a direction tending to restore the cantilever member in a null position.

Other and further objects of the invention will be apparent from the following description taken in connection with the accompanying drawings, and its scope will be pointed out in the appended claims.

In the drawings:

FIG. 3 is a sectional view, partially schematic, of a modification of the valve in FIG. 1;

FIG. 3A is a detailed view, partly in section, of a pressure compensator in FIG. 3;

FIG. 3B is a sectional view, partly schematic, of a modification of the valve in FIG. 3;

FIG. 4 is an enlarged detailed view of a fluid passageway in the valves of FIGS. 3 and 3B;

Figure 5:
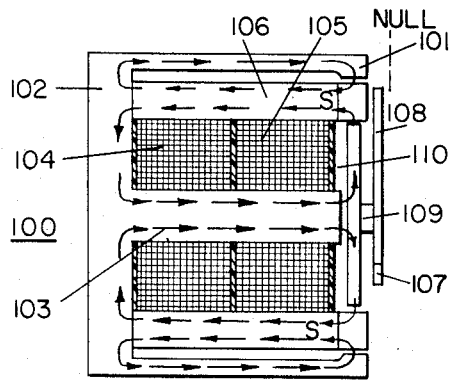
Figure 6:
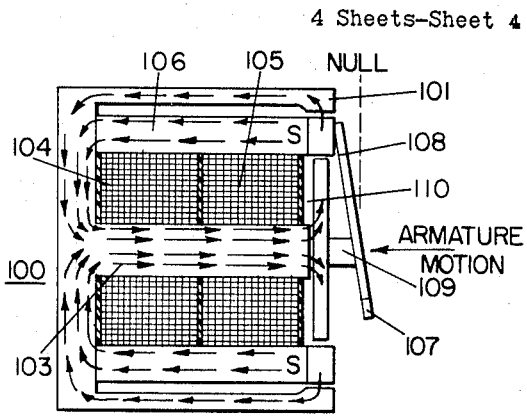
Figure 7:
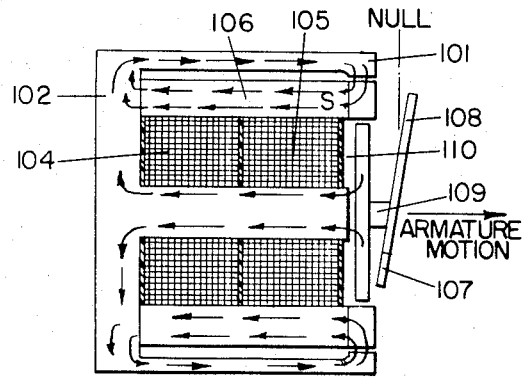

FIGS. 5, 6, and 7 are sectional, partially schematic, views of an electromagnetic motor for use in the valves of FIGS. 1, 1A, 3 and 3B.

Figure 8:
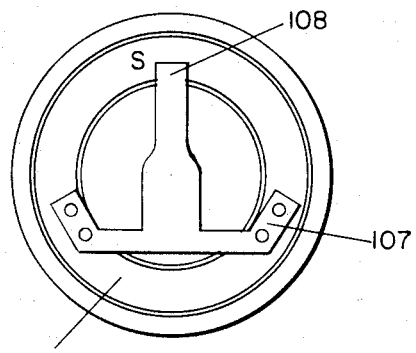
Figure 9:
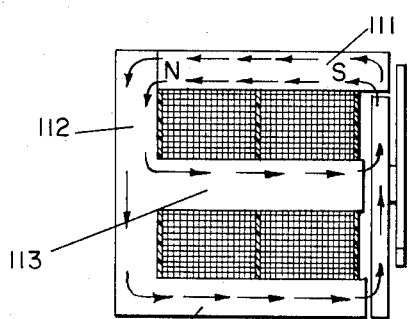
Figure 10:
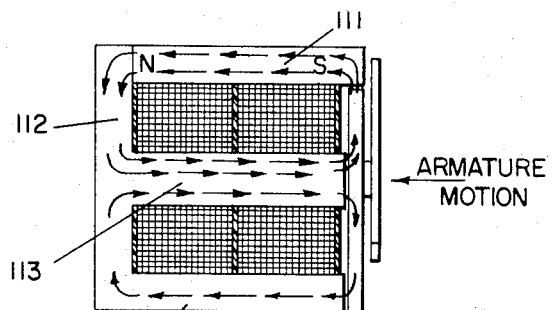

FIG. 8 is an end view of the motor in FIGS. 5–7;

FIGS. 9–11 are sectional views of a modification of the motor in FIGS. 5–7.

Figure 1:
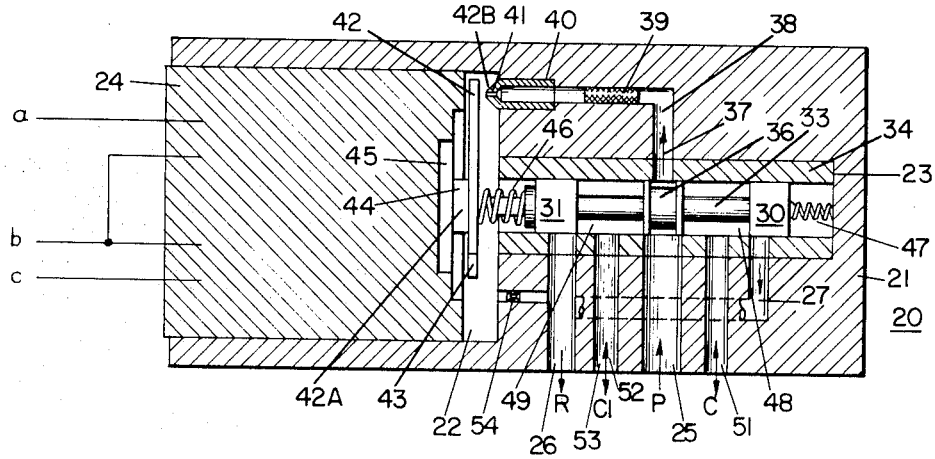
FIG. 1 is a sectional view, partially schematic, of an electrohydraulic servo valve embodying the invention.

*Description and explanation of the valve in FIG. 1*

Referring now to the drawing and with particular reference to FIG. 1, it is here illustrated an electrohydraulic, two stage, servo valve having a variable pressure pilot stage and a slide piston valve control stage.

The valve is generally indicated at 20. The valve includes a valve body 21 in which is formed a pilot variable pressure chamber 22, a control stage 23 and a cavity for an electromagnetic motor 24. The valve is coupled to a source of fluid under pressure through an input pressure port and passageway 25 and a return pressure port and passageway 26. The passageways 25 and 26 are connected through the body to the interior of the control stage cylinder. The passageway 26 is coupled to a control land 30 and through a passageway 27, to a control land 31 of a control stage piston 33. The piston 33 is slidably disposed in the control stage cylinder provided by a sleeve 34. The passageway 25 is coupled through an opening in the sleeve 34 to a land 36 of the piston 33.

Fluid under pressure is coupled through an opening in the sleeve 34 to a passageway 38 and a filter 39 to a variable orifice control nozzle 40. The nozzle 40 is coupled into the pilot chamber 22 through an orifice 41. A cantilevered member 42 is integrally formed to a torsion bar 43 and connected through a coupling member 44 to an armature 45 of the motor 24. A feedback spring 46 is connected to the lever 42 and an end of the piston 33 to couple them together. The piston 33 moves in opposition to a bias spring 47 connected to the valve body and the other end of the piston 33. The input force applied to the member 42 is along the central axis. The point of application is taken with respect to the fulcrum point provided by the torsion bar 43. The distance from the torsion bar to the point of application is substantially less than the distance between the control or free end of the member 42 and the torsion bar fulcrum point. Motion along the central or input axis results in amplified motion of the control and of the member 42. A displacement along the input or central axis may, e.g., produce three times that displacement in the vicinity of the orifice 41. The orifice 41 is termed in the art a variable orifice, variation takes place by virtue of the degree of occlusion of the orifice by the member 42.

The control stage is hydraulically connected in the well known four way coupling. Control chamber 48 and a control chamber 49 is formed by the lands of the piston 33 and the interior of the sleeve 34. The chamber 48 is coupled through a passageway 50 and control port 51 to an output load. The chamber 49 is coupled through a passageway 52 and output control port 53 to an output load. The pilot chamber 22 is coupled through a fixed orifice 54 to the return passageway 28 and return port 26.

Figure 2:
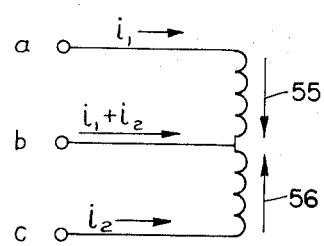
FIG. 2 is a schematic circuit diagram illustrating the connections for the electromagnetic motor in the valves of FIGS. 1 and 1A.

The coils of the motor 24 are connected in series opposition shown particularly in FIG. 2. The leads extending from the motor are connected to terminals marked A, B, and C as shown. The motor coils 55 and 56 are typically connected as shown in FIG. 2 for a so-called double-ended input circuit. For single-ended circuits, the coils may be series or parallel connected.

Operation

The motor force 24 is typically connected to a push pull output circuit such that current in opposition is introduced between the terminals A and B and the terminals B and C. In the quiescent condition there is no net output signal produced by the opposing currents, consequently the armature 45 remains in the null position. The member 42 is cantilevered about the torsion bar 43 to provide amplified pilot pressure control as will be described more completely below. Fluid under pressure is coupled through the input pressure port 25 and passageway 27 through the passageway 38 and filter 39 to the pilot control nozzle 40 and variable orifice 41. In the null position the flow of fluid through the nozzle 41 is controlled by the position of the lever 42 in such a manner as to produce a pressure in the chamber 22 which is coupled to the left end as shown of the piston 33. This pressure is exactly balanced by the bias spring 47 to hold the piston 33 in the null position, as shown. The land 30 of the piston 33 controls the opening of the fluid passageway 29 to the control chamber 48. The land 31 controls the opening of the chamber 49 to the return passageway 28. The center land 36 controls the opening of the chambers 48 and 49 with respect to the centrally disposed input pressure passageway 25.

When the free or control end of the lever 42 is displaced from the null position with respect to the orifice 41, the pressure in the chamber 22 varies accordingly. Motion of the lever 42 to the right tends to occlude the orifice 41 and reduce the pressure in the chamber 22. The force acting on the left end as shown of the piston 33 is accordingly reduced and displacement of the piston is initiated to the left.

Motion of the piston to the left causes the land 31 to connect the chamber 49 to the return passageway 26. The land 36 connects the chamber 48 to the pressure passageway 25. Thus the output control passageways 51 and 53 are coupled to the chambers 48 and 49, respectively, in such a manner as to produce fluid flow from the chamber 48, through the passageway 51 under pressure to the load and return through the passageway 53, the chamber 49 and the return passageway 26 to the source of fluid.

Motion of the piston 33 to the left is translated through the feedback spring 46 to the lever 42 tending to displace the lever 42 to the left. Motion of the member 42 to the left toward the null position reduces the occlusion of the orifice 41 to increase the pressure in the chamber 22 and stop motion of the piston 33.

Motion of the lever 42 initially to the left tends to reduce the occlusion of the orifice 41 and increase the pressure in the chamber 22. The piston 33 is then displaced to the right in opposition to the force of the bias spring 47. In that case the chamber 48 is coupled to the return passageway 29 and the chamber 49 is coupled to the pressure passageway 27.

For maximum sensitivity the stiffness of the torsion bar 43 should be relatively low to enable amplified motion of the lever 42. For maximum frequency response the stiffness of the spring 46 should be relatively high. This problem is solved in the valve as shown by applying the feedback force through a relatively stiff spring acting directly along the axis of motion of the armature of the force motor 24. The displacement of the free or control end of the lever 42 is an amplification of the displacement of the point of the lever 42 at which the input force of the spring 46 applies.

Thus, when the lever 42 is displaced to the right, the resulting motion of the piston 33 to the left exerts a restoring force through the spring 46 only in opposition to the force provided by the motor 24. The motion of the free end of the lever 42, however, is amplified by virtue of its cantilevered position so that its motion takes place with respect to the relatively low torsional force provided by the torsion bar 43.

The mechanical stiction force applied to the piston 33 is overcome in the valve by a novel configuration. The variable pressure nozzle 41 is disposed at the input or high pressure side of the variable pressure chamber 22. The fixed orifice 54 is disposed in the output of the chamber 22. Assuming the valve is coupled to a typical hydraulic pump source, the pressure at the input of the nozzle 40 characteristically pulsates at the pumping frequency. When the variable orifice is located at the output of the pilot chamber and the fixed orifice is located at the input of the pilot chamber, these small variations tend to be filtered out. Here, however, in combination with the amplification provided by the leverage of the lever 42, small variations in pressure of fluid introduced through the nozzle 40 cause the lever 42 to be displaced. These small displacements change the pressure in the chamber 22. The pressure changes are coupled to the piston 33 to cause it to move a very small amount at a relatively high frequency and overcome mechanical stiction. By virtue of the unique combination provided in the valve of the invention, no external dithering of any kind is required for normal pump sources of fluid. This is in contrast to prior art devices involving either a mechanical or electrical dithering signal applied to the control stage piston.

Figure 1A:
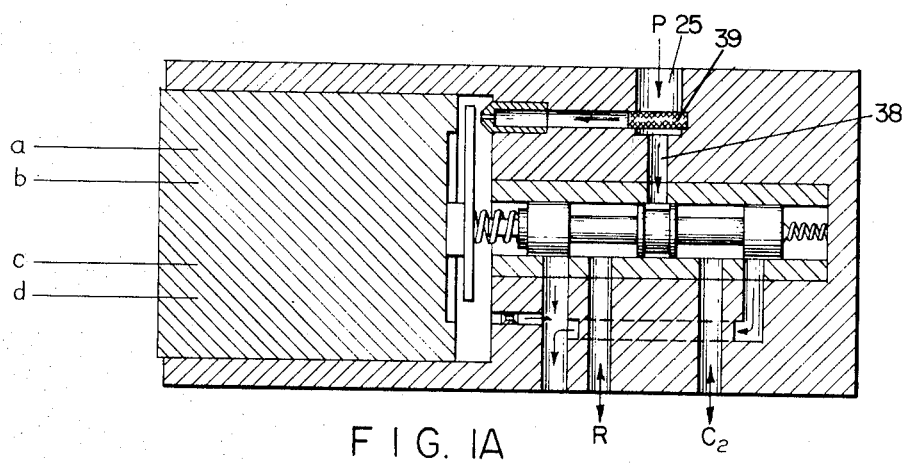
FIG. 1A is a sectional view, partially schematic, of a modification of the valve in FIG. 1.

In FIG. 1A a modification of the valve in FIG. 1 is shown. Here the filter 39 is shown connected in series between the input pressure passageway 25 and the passageway 38 leading to the control stage cylinder.

Pilot fluid passes through the filter into the nozzle 40 and orifice 41. Control stage fluid passes around the filter 39 and continuously washes it. This precludes the accumulation of contamination around the filter. By so doing, the rate of filter replacement is substantially reduced.

Description and explanation of the valves in FIGS 3 and 3B

Referring now to FIG. 3, there is here illustrated a sectional view of a modification of the valve in FIG. 1.

In the valve of FIG. 3 a novel sealing structure is utilized which greatly improves the reliability of the valve. In addition, a modification of the torque motor in FIG. 1 is described in greater detail. A pressure compensator device is included in series with the pilot valve to maintain the input pressure at a reasonably constant level.

Here the valve is generally indicated at 60 and the valve body at 60a. The input fluid under pressure is applied to the pressure annular conduit 57 and the return annular conduits 58 and 59. Control ports 61 and 62 are coupled through annular control chambers 64 and 65. The chambers 57, 58, 59, 64, and 65 are formed by a sleeve 66 having annular metallic elements extending radially which form lip seals 66a against the valve body. The lips are so formed as to extend in the direction of the source of relatively high pressure. For example, the pressure in chamber 57 is always at least as great as that in either of the control chambers 64 or 65. The pressure in the chamber 65 is always as least as great as the chamber 59, and the pressure in the chamber 64 is always as least as great as the pressure in the chamber 58. An inner sleeve 67 provides the control valve cylinder. The sleeve 67 is surrounded by the sleeve 66 and has openings corresponding with the chambers 57, 58, 59, 64, and 65.

The piston 69 has lands 70, 71, and 72 which control the application of pressure and return to the control passageways.

Fluid under pressure is coupled through the annular chamber 57 and a passageway in the valve body to a pressure compensator 73. The fluid passes through the filter 74 and pressure compensator to the pilot nozzle 75 and variable orifice 76 into the pilot variable pressure chamber 68. Fluid return or output from the chamber 68 is through a fixed orifice 76a leading to the return passage 59. A bias cylinder 77 and piston 78 are coupled through a passageway 79 to a source of fluid under pressure. Piston 78 directly engages an end of the control piston 69.

In the quiescent condition the pressure in the chamber 68 exactly balances the force applied in opposition of the piston 78 due to fluid under pressure acting on it to provide a bias force. Here the torque motor controls the cantilever member 80 which is integrally formed with a torsion bar 83. An armature 89 is formed to receive and is connected to a feedback spring 81 which is connected to an end of the piston 69. A filter member 82 surrounding an end of the sleeves 66 and 67a has the purpose of providing secondary filtration for the fixed orifice 76a to protect it when the motor is removed. Here the torque motor 88 includes a permanent magnet in the form of a cylindrical tubular section polarized as indicated. The permanent magnet is connected with a low retentinity low reluctance soft iron pole pieces 90 which carries the coils 85 and 86. The coils 85 and 86 are sealed by a member 91 so that no fluid is directly in contact with the coils. A pole piece 92 directs the flux to the armature 89. It is to be noted that the permanent magnet is in contact with the fluid in the pilot chamber 68 and serves as a magnet filter to remove contamination which is ferromagnetic. This is particularly useful in the vicinity of the active motor gap between the armature 89 and pole piece 92. The permanent magnet 84 has external thread and the inside of the valve body in the area of the motor cavity is threaded to receive the torque motor. By this means the motor may be readily extricated from the valve.

Referring now to FIG. 3A, there is here illustrated an enlarged detail view of the pressure compensator. Fluid under pressure passes through the filter 74 to the compensator 73. A cylinder is formed in a compensator block 93 in which is a slidable piston 94. The position of the piston is determined by the pressure in the nozzle 75 acting against the left side as shown of the piston 94. The compensation bias spring 95 acts on the other side of the piston 94 and supplies a fixed bias for a predetermined pressure condition. The force of the spring 95 may be adjusted externally by means of a threaded control 96. If the pressure within the nozzle 75 decreases, the piston 94 is displaced in such a manner as to increase the pressure and restore the balance.

The details of the lip seal are shown in FIG. 4. Here it may be seen that the control position of the piston 69 and in particular of the land surface relative to the aperture in the sleeve 67 is indicated. It will be apparent that fluid under pressure operates to force a constant seal against the valve body.

Referring now to FIG. 3B, there is here illustrated a sectional view of a servo valve illustrating a modification of the valve in FIG. 3. The valve of FIG. 3 is termed single ended in its operation. The valve as illustrated in FIG. 3B is termed balanced or double ended in its operation. In the modification of FIG. 3B, the valve includes two pilot stages and two torque motors. The control stage is essentially the same as the control stage of the valve in FIG. 3. The slidable piston is coupled at its opposite ends through a pair of feedback springs to the movable cantilevered members controlling the occlusion of a pair of input nozzles. The valve as shown is a four-way valve, being adapted for coupling an input fluid under pressure and a pair of return fluid passageways to a source of fluid, such as a hydraulic pump. A pair of control passageways are adapted for coupling to a load, such as a hydraulic motor. The valve body and its elements are generally cylindrical in shape and disposed coaxially along the axis of the valve.

The valve is generally indicated at 100. In the valve body 101 are disposed at opposite ends in threaded cavities a pair of torque motors 102 and 103. The motors are coupled to movable armatures 104 and 105, which carry cantilevered members 106 and 107. Pilot variable pressure chambers 108 and 109 are formed in the body of the valve. Pilot nozzles 110 and 111 are coupled to a source of fluid for flow through the nozzle orifices 112 and 113. Fluid under pressure is coupled to a source through an input passageway 114 and annular conduit 115 through a passageway 116 and 117, a filter 118 to the nozzle 111. Fluid under pressure is also coupled through a passageway 119 and filter 120 to the nozzle 110. The levers 106 and 107 are cantilevered about torsion bars 120 and 121. The forces acting on the lever are along the central axis of the valve.

The control valve is disposed in a cylindrical cavity formed in the valve body coaxially with its central axis. An outer cylindrical sleeve 122, having lip seals 123 in contact with the valve body, is disposed in such a manner as to provide annular conduits for fluid passage and has openings communicating with an inner sleeve 124. Openings in the inner sleeve 124 and the outer sleeve 123 communicate with control chambers formed by the lands of the control piston 125. The ends of the control piston 125 are coupled through feedback springs 126 and 127 to the levers 106 and 107. The control chambers communicate with return passageways 128 and 129, coupled to the source of fluid. The control chambers are directly coupled to output control passageways 130 and 131 through openings in the sleeves 124 and 122. A pair of output fixed orifices 132 and 133 communicate directly with return passageways 129 and 128 respectively.

Displacement of the piston 125 to the left connects the return passage 128 through the control passage 131, and the pressure passageway 114 through the other control chamber and control passageway 130. Displacement of the piston valve 125 to the right reverses the flow in the control passageways and ports.

*Operation*

An input signal is applied to both torque motors in such a manner as to displace the levers 106 and 107 in the same direction. When the levers are displaced to the right, the pressure in the chamber 108 increases, and the pressure in the chamber 109 decreases to displace the control piston 125 to the left. Conversely, when the levers are displaced to the left, the pressure in the chamber 108 decreases and the pressure in the chamber 109 increases to displace the control piston 125 to the right. Thus it will be apparent that the valve operates in a push-pull manner with respect to the displacement of the piston 125. Motion of the piston 125 to the left connects the return passageway 128 to the control passageway 131. The pressure passageway 114 is connected to the control passageway 130. The lever 106 is acted on by the feedback spring 126 tending to restore it to a null position. The lever 107 is acted on by the spring 127 tending to restore it to a null position.

In another mode of operation, the levers 106 and 107 may be normally hard over to completely occlude the nozzle orifices 112 and 113 respectively. The motors are then connected in such a manner that an input signal in one direction, for example, tending to displace the piston 125 to the left, would displace the lever 106 to the right to increase the pressure in the chamber 108. The signal does not act on the motor 103 at all. Conversely, if it is desired to displace the piston 125 to the right, the orifice 112 remains occluded and the lever 107 is displaced to the left to increase the pressure in the chamber 109 and displace the piston 125 to the right.

The basic chip clearing ability of the valve is retained in this embodiment. In the event, for example, that contamination completely occludes the nozzle 113, the pressure in the chamber 109 drops to return pressure and the piston 125 moves all the way to the left. When the pressure in the chamber 109 drops to return pressure, the piston 125 is forced to the left in a hard over position and the lever 107 displaced all the way to the left. This enables the fluid through the orifice 113 to clear it of any contamination and restore the null condition.

There are several advantages to the configuration shown in FIG. 3B. While the valve is connected for push-pull input operation in the pilot stage, each lever 106 and 107 is free to operate independently of the other. In the typical prior art mode of operation, a single flapper or movable pilot lever is used to control a pair of nozzles which are oppositely disposed and apply fluid under pressure from both directions. In such a situation the motion of the lever is restricted to a very narrow range. This greatly increases the contamination problem. Here that problem is overcome.

The type of valve involving a movably member which controls the flow of fluid through an input orifice for the purpose of thereby varying the pressure in a variable pressure chamber typically has a low inertia movable control element which is relatively stiff. While such a valve has a very high frequency response characteristic, and relatively high sensitivity, it does have the disadvantage of having a continuous fluid drain. For many applications there is a requirement for a substantially zero leakage valve. This requirement can be met with the present invention utilizing the second mode of operation.

With the configuration of FIG. 3B, the structure of the valve is tremendously simplified. A minimum number of fluid passageways are required and the basic symmetry of the valve is relatively undisturbed. By this means, the valve form factor may be optimal.

*Description and explanation of the motor in FIGS. 5–8*

Referring now to FIGS. 5–8, there is here illustrated an electromagnetic force motor useful in the present invention. This torque motor includes low reluctance, low retentivity core material having an E cross-section form. It has disposed within a permanent magnet between the arms of the E. More particularly, the torque motor core is generally cylindrical in shape and is integrally formed with an end cap. The permanent magnet or high retentivity ferromagnetic bias source is also cylindrical. Attached to the core is a torsion bar integrally formed with a cantilevered control member. The member is coupled through to a movable armature disposed within the permanent magnet. The armature is generally disc shaped and is in spaced relation relative to the core and the bias means.

In FIG. 5 the torque motor is generally indicated at 100. A cylindrical, tubular low retentivity low reluctance ferromagnetic core 101 integrally connected to an end cap 102 and a centrally disposed member 103. The member 103 carries a pair of coils 104 and 105. A cylindrical permanent magnet 106 is attached to the end cap 102 and surrounds the member 103 and the coils. As shown in FIG. 8 a torsion bar 107 is attached to the permanent magnet 106 at the end of the bar by means for example of welding. Extending from the center of the bar perpendicular to the axis of twist or torsion is the cantilevered control member 108.

A coupling member 109 is attached to the lever 108 at such a point as to provide substantial amplification of the displacement of an armature 110 at the extreme free end of the member 108. The flux lines for the quiescent or null condition are shown in FIG. 5. When the lever 108 is displaced toward the core material, to the left as shown, the flux lines are as indicated in FIG. 6. When the lever is displaced to the right as shown in FIG. 7, the flux lines are indicated therein with respect to a central null position.

From FIGS. 5 through 7 it will be apparent that the outer cylindrical shell of low retentivity low reluctance material provides in effect a shield for the permanent magnet 106 to increase the efficiency of the torque motor.

*Description and explanation of the torque motor in FIGS. 9–11*

Referring now to FIGS. 9–11, there is here illustrated a modification of the motor in FIGS. 5–8. Here the upper arm of an E section form core is formed from a permanent magnet. Thus in FIG. 9 a semicylindrical tubular segment permanent magnet 111 extends from a low reluctance low retentivity end cap 112. A central arm 113 formed of low retentivity material extends from the cap 112 and the lower arm 114 of the E section extends from the cap 112. The arm 114 is a semicylindrical tubular shell segment. The end view in FIG. 11A shows the making of the permanent magnet 111 and core arm 114 to complete a cylindrical shell.

The magnetic flux for the quiescent condition is shown in FIG. 9. In FIG. 10 magnetic flux for the condition in which the armature is displaced to the left is indicated, and in FIG. 11 the condition for which the armature is displaced to the right.

It will be apparent from the foregoing discussion that the servo valve and torque motor of the present invention greatly enhance the art of servo control mechanisms.

While there is hereinbefore presented what are at present considered to be the preferred embodiments of the invention, it will be apparent to those of ordinary skill in the art that many modifications and changes may be thereto made without departing from the true spirit and scope of the invention.

It will be considered, therefore, that all those changes and modifications which fall fairly within the scope of the invention shall be a part of the invention.

What is claimed is:

1. A servo valve, comprising:
   pilot valve means including a variable pressure pilot chamber having an input orifice for the flow of fluid under pressure and an output fixed orifice for providing a constant pressure drop;
   motor means having a cantilevered member for varying the flow of said fluid through said input orifice to vary the pressure in said pilot chamber in response to an input signal;
   control valve means including a control cylinder coupled to a source of fluid under pressure and having output control ports;
   a control piston slidably mounted in said control cylinder for controlling fluid flow in said output control ports in accordance with the relative position of said control piston and said control cylinder, said control piston being coupled to said pilot chamber for movement in accordance with the pressure therein; and
   feed-back means coupling said control piston and said cantilever member whereby motion of said cantilever member so varies the pressure in said pilot chamber as to displace said control piston in a direction tending to restore said cantilever member in a null position.

2. A servo valve, comprising:
a valve body having fluid passageways for coupling to a source of fluid under pressure through said valve to output control ports;
pilot valve means including a variable pressure pilot chamber having an input orifice for said fluid and an output fixed orifice for providing a constant pressure drop;
motor means having a cantilevered member coupled to said input orifice for varying the flow of said fluid through said input orifice to vary the pressure in said pilot chamber in response to an input signal;
control valve means in said body, including a control cylinder coupled to said source and said output control ports, a sleeve surrounding said cylinder and having metallic annular conduit defining, resilient seal members bearing against said body for coupling said fluid through said cylinder;
a control piston slidably mounted in said control cylinder for controlling fluid flow in said output control ports in accordance with the relative position of said control piston and said control cylinder, said control piston being coupled to said pilot chamber for movement in accordance with the pressure therein; and
feed-back means coupling said control piston and said cantilever member whereby motion of said cantilever member so varies the pressure in said pilot chamber as to displace said control piston in a direction tending to restore said cantiliver member in a null position.

3. A servo valve, comprising:
pilot valve means including variable pressure pilot chamber having an input orifice for the flow of fluid under pressure and an output fixed orifice for providing a constant pressure drop;
compensation means coupled to said pilot valve means for adjusting the pressure in said chamber in accordance with the pressure of input fluid to compensate for pressure fluctuations of said input fluid;
motor means having a cantilevered member for varying the flow of said fluid through said input orifice to vary the pressure in said pilot chamber in response to an input signal;
control valve means including a control cylinder coupled to a source of fluid under pressure and having output control ports;
a control piston slidably mounted in said control cylinder for controlling fluid flow in said output control ports in accordance with the relative position of said control piston and said control cylinder, said control piston being coupled to said pilot chamber for movement in accordance with the pressure therein; and
feed-back means coupling said control piston and said cantilever member whereby motion of said cantilever member so varies the pressure in said pilot chamber as to displace said control piston in a direction tending to restore said cantilever member in a null position.

4. A servo valve, comprising:
pilot valve means including a variable pressure pilot chamber having an input orifice for the flow of fluid under pressure and an output fixed orifice for providing a constant pressure drop;
motor means having a cantilevered member for varying the flow of said fluid through said input orifice to vary the pressure in said pilot chamber in response to an input signal;
control valve means including a control cylinder coupled to a source of fluid under pressure and having output control ports;
a control piston slidably mounted in said control cylinder for controlling fluid flow in said output control ports in accordance with the relative position of said control piston and said control cylinder, said control piston being coupled to said pilot chamber for movement in accordance with the pressure therein;
control piston bias means coupled to said piston for providing a null condition pressure acting on said piston in opposition to said pilot pressure; and
feed-back means coupling said control piston and said cantilever member whereby motion of said cantilever member so varies the pressure in said pilot chamber as to displace said control piston in a direction tending to restore said cantilever member in a null position.

5. A servo valve, comprising:
pilot valve means including a variable pressure chamber having an input orifice for the flow of fluid under pressure and an output fixed orifice for providing a constant pressure drop;
motor means having a cantilevered member for varying the flow of said fluid through said input orifice to vary the pressure in said pilot chamber in response to an input signal;
control valve means including a control cylinder coupled to a source of fluid under pressure and having output control ports;
a control piston slidably mounted in said control cylinder for controlling fluid flow in said output control ports in accordance with the relative position of said control piston and said control cylinder, said control piston being coupled to said pilot chamber for movement in accordance with the pressure therein;
filter means coupled in series with fluid flowing to said pilot valve and having a filter member coupled in series with fluid flowing through said control valve; and
feed-back means coupling said control piston and said cantilever member whereby motion of said cantilever member so varies the pressure in said pilot chamber as to displace said control piston in a direction tending to restore said cantilever member in a null position.

6. A servo valve, comprising:
pilot valve means including a variable pressure pilot chamber having an input orifice for the flow of fluid under pressure and an output fixed orifice for providing a constant pressure drop;
electromagnetic motor means having a cylindrical, tubular permanent magnet surrounding an electrical coil to provide bias flux for said motor means and magnetic filtering for said fluid, said motor means having acantilevered member for varying the flow of said fluid through said input orifice to vary the pressure in said pilot chamber in response to an input signal;
control valve means including a control cylinder coupled to a source of fluid under pressure and having output control ports;
a control piston slidably mounted in said control cylinder for controlling fluid flow in said output control ports in accordance with the relative position of said control piston and said control cylinder, said control piston being coupled to said pilot chamber for movement in accordance with the pressure therein; and
feed-back means coupling said control piston and said cantilever member whereby motion of said cantilever member so varies the pressure in said pilot chamber as to displace said control piston in a direction tending to restore said cantilever member in a null position.

7. A servo valve, comprising:
pilot valve means including a variable pressure pilot chamber having an input orifice for the flow of fluid under pressure and an output fixed orifice for providing a constant pressure drop;

electromagnetic motor means having a cylindrical, tubular permanent magnet surrounding an electrical coil to provide bias flux for said motor means and magnetic filtering for said fluid, said motor means having a cantilevered member for varying the flow of said fluid through said input orifice to vary the pressure in said pilot chamber in response to an input signal;

a cylindrical, tubular magnetic shield surrounding said permanent magnet and formed of low reluctance, low retentivity, ferromagnetic material;

control valve means including a control cylinder coupled to a source of fluid under pressure and having output control ports;

a control piston slidably mounted in said control cylinder for controlling fluid flow in said output control ports in accordance with the relative position of said control piston and said control cylinder, said control piston being coupled to said pilot chamber for movement in accordance with the pressure therein; and feed-back means coupling said control piston and said cantilever member whereby motion of said cantilever member so varies the pressure in said pilot chamber as to displace said control piston in a direction tending to restore said cantilever member in a null position.

References Cited by the Examiner

UNITED STATES PATENTS

| | | | |
|---|---|---|---|
| 2,286,027 | 6/1942 | Towler et al. | 137—116.3 |
| 2,924,241 | 2/1960 | Bauer | 137—625.62 X |
| 2,926,696 | 3/1960 | Kolm | 137—625.62 |
| 2,934,765 | 4/1960 | Carson | 137—625.61 |
| 2,993,510 | 7/1961 | Collins | 137—625.64 |
| 3,023,781 | 3/1962 | Larsen | 91—52 X |
| 3,071,714 | 1/1963 | Hadekel | 317—172 |
| 3,076,920 | 2/1963 | Gordon et al. | 317—172 |
| 3,114,394 | 12/1963 | Panissidi | 137—625.64 |
| 3,135,494 | 6/1964 | Parkvis | 251—309 X |

MARTIN P. SCHWADRON, *Acting Primary Examiner.*

M. CARY NELSON, *Examiner.*